April 28, 1959     D. H. ROBBINS     2,884,327
METHOD OF PROCESSING WHEAT
Filed Aug. 12, 1955
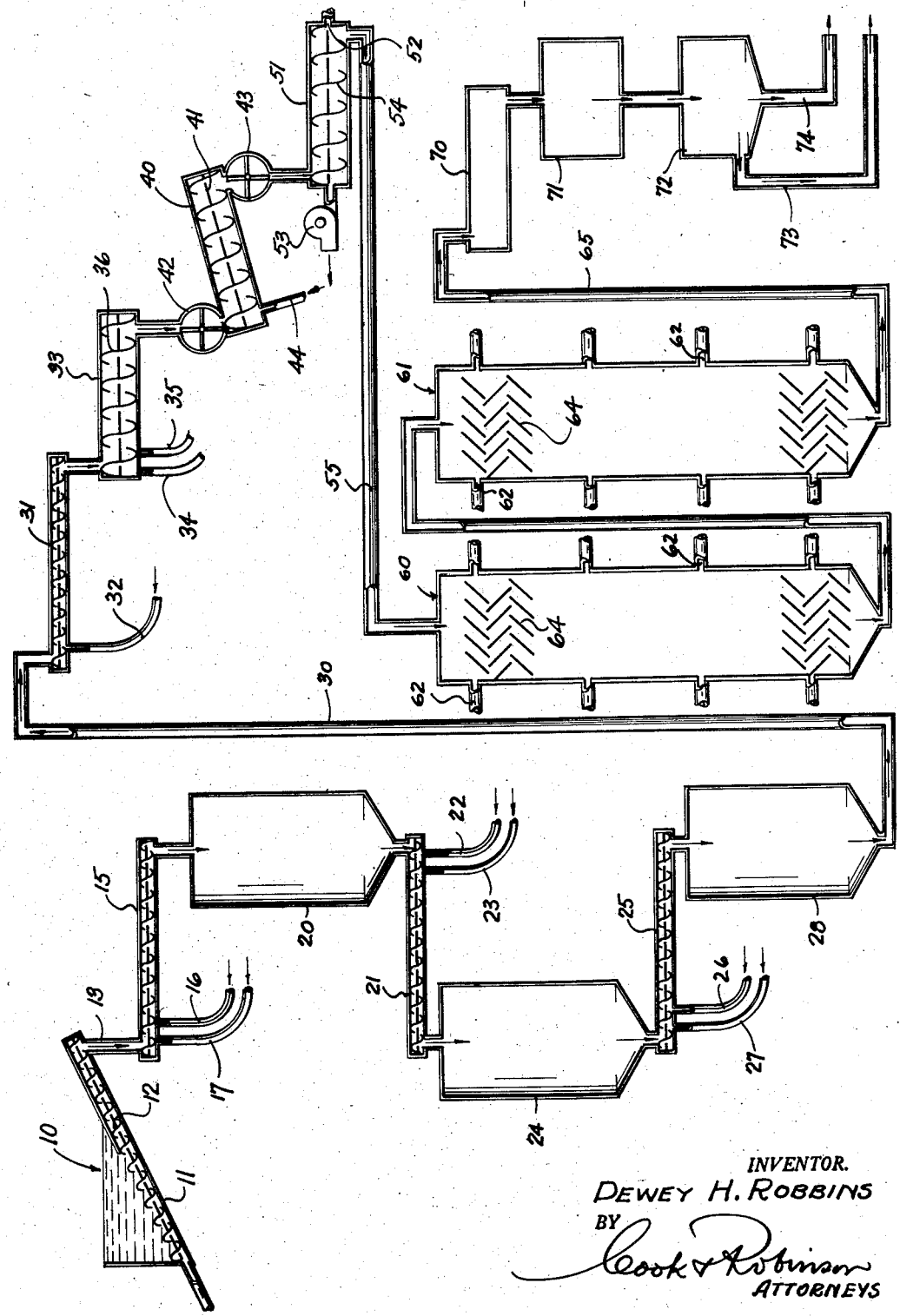
INVENTOR.
DEWEY H. ROBBINS
BY
ATTORNEYS

United States Patent Office 2,884,327
Patented Apr. 28, 1959

2,884,327

METHOD OF PROCESSING WHEAT

Dewey H. Robbins, Seattle, Wash., assignor to Fisher Flouring Mills Co., Seattle, Wash., a corporation of Washington Application August 12, 1955, Serial No. 528,096

1 Claim. (Cl. 99—80)

This invention relates to a new and improved method for processing wheat whereby the processed wheat product can be readily cooked or prepared and eaten in a manner similar to eating rice. More particularly, this invention relates to a relatively simple, inexpensive, continuous process for the treatment of large quantities of the berry or kernel portion of wheat.

The product of my new and improved process is not entirely new. It is a product similar to processed wheat which has for many years past been prepared at home by people of the Asiatic and Middle-Each countries where it is commonly known as "bulgur." In the home or domestic preparation of the wheat, the whole wheat berry is cooked in water at moderate temperatures for a substantial period of time. Then after being cooked or processed, the wheat berries are spread in the sun to dry, and after drying are packaged or placed on containers and stored until time for consumption.

It is well known that at the present time the Asiatic peoples have a critical shortage of rice which is the primary substance of their diet, while in the United States there is a very substantial surplus of wheat. It is, therefore, a principal object of my invention to provide a new and improved, continuous method for processing the whole berry or kernel of wheat in a manner which will make it readily consumable and appetizing and thereby permit a utilization of the surplus wheat primarily in the geographic areas where a rice shortage exists.

Another object of my invention is to provide a new and improved method for processing wheat which retains the natural and inherent nutritional properties in the product.

My new and improved method of processing wheat is a multiple stage or step process which, briefly recited, comprises the following steps:

The wheat is cleaned and the chaff is removed. It is then subjected to a treatment whereby the moisture content of the wheat berry is substantially increased. Thereafter, the wheat is steamed for a short interval of time and then cooled and dried. After drying, the product is pearled, cracked, screened and packaged for storage or shipment. This entire operation of preparing the wheat is carried on as a continuous process, as distinguished from a batch process, and the total elapsed time of processing is approximately twenty-four hours.

In carrying out my new and improved process, I am able to utilize relatively conventional and readily available milling equipment. However, this equipment as herein used, is believed to be assembled in a new combination, and thus the sequence of steps or stages of the treatment provides a new method for treating wheat or similar products.

As a result of experiments, I have found that my new and improved method is substantially more suitable to the processing of certain types of wheat than others; the most preferred type being the soft, white wheat berry as distinguished from the red wheat. The red wheat product is relatively dark in color and is less appetizing and appealing than the product produced from soft, white wheat.

The fundamental purpose of the treatment, which characterizes this invention, is to gelatinize the starch in the wheat berry thereby to reduce the cooking time required for the individual consumer to prepare the product for eating. To accomplish this necessary and desired result, I have found that additional moisture must be absorbed by the cleaned wheat berry prior to carrying on subsequent stages of the process. If the moisture content of the wheat berry is not increased, the starch contained therein will be converted to dextrin and will burn in the later stages of the treatment. It is, therefore, a critical step in my method of processing the wheat, to first increase its moisture content so as to permit the further processing without destroying the nutritional value or causing other detrimental transformation of the wheat.

The first step in my process, namely, the cleaning of the wheat is accomplished by conventional processes. The wheat berry is first cleaned by a dry process whereby the loose dust, dirt and the chaff is removed therefrom and after these dry foreign substances have been removed, the wheat berries are washed in tap temperature water to remove remaining dust and dirt and thereby leaving the clean wheat berry or kernel.

After the wheat berries have been thoroughly cleaned as above noted, they are conveyed to the next stage where the moisture content thereof is substantially increased from a normal moisture content of approximately 10% to approximately 35% before being subjected to the subsequent steps or stages of the process.

To increase the moisture content, the wheat is sprayed with water while moving through a conveyor and it is believed to be preferable to use a screw conveyor where possible. Also, steam is injected into the conveyor to raise the temperature of the wheat to approximately 150° F. The increased temperature increases the water absorption of the wheat. From the conveyor, the heated and water-laden wheat is discharged into a large tank. The wheat enters the tank at the top and is removed by a conveyor from the bottom. In the apparatus which I am now utilizing, I employ three separate tanks, and the wheat progresses from the first tank to the subsequent tanks in a continuous process. It requires approximately four hours for the wheat to move downwardly in the first tank from top to bottom and then be carried from there to the second tank. During the treatment in the first tank, the moisture content is increased from approximately 10% to approximately 25%.

The wheat is conveyed from the bottom of the first tank to the top of the second tank and while in the horizontal conveyor, the wheat is again sprayed with water and steam is injected to maintain the temperature of approximately 150° F.

In each stage of the multiple tank treatment, the wheat will absorb substantially greater quantities of water. When removed from the second tank, the moisture content of the wheat is raised to approximately 30%. It requires approximately four hours for the wheat to progress through the second tank and from this it is conveyed, in a similar manner, to the third tank.

The process in the third tank is identical to that of the previous tanks. The steam is injected into the conveyor to heat the wheat and the wheat is sprayed with water. When removed from the third tank, the moisture content of the wheat is approximately 35%. The total time required for the wheat to be processed in each tank is about four hours; for a total elapsed time of about twelve hours. As previously stated, this is a continuous operation where the wheat is continually going into the tanks, at the top, and out from the bottom. The movement of the wheat from one tank to another is synchronized so as to provide substantially the same quantity of wheat in each tank at all times.

From the third tank, the wheat is conveyed by a screw conveyor and buckets, in the presence of steam, to a hydrator or blancher. In the blancher, additional moisture or water is added and the temperature is increased to approximately 200° F. The wheat remains in the blancher for approximately six or seven minutes. Again, this is a continuous process of feeding the wheat through the blancher, wherein the water temperature in this stage has been substantially increased. The time required in the blancher is governed by the result desired, namely, to raise the temperature of the wheat to approximately 200° F. This temperature increase, in the presence of water, increases the moisture content of the wheat to approximately 40%.

From the blancher, the moisture saturated wheat is conveyed by gravity to a continuous process, pressure steamer. In my process I prefer to use a steamer tunnel which is upwardly inclined from a point where the wheat enters, and I have found it preferable to use an angle of upward inclination of approximately 25 degrees. The wheat is advanced through the steamer from the forward, lower end to the upper, discharge end. The steamer presently in use is approximately twelve feet long. At each end of the steamer, I employ a rotary valve type pressure lock; the wheat being fed into the valve mechanism at the receiving end, which valve revolves to deposit the wheat into the steamer. The steamer is maintained under a continuous pressure of approximately 30 p.s.i. and the steaming treatment is carried on for approximately one hundred seconds. It will be appreciated that if the pressure were increased the time of treatment in the steamer may be decreased and if the pressure is decreased the time of treatment will be increased. It is desired to use the lowest possible pressure so as to assure that there will be no burning of the product and it has been found that a better product can be produced when the lower pressure, in the neighborhood of 30 p.s.i., is used. At the upper end of the steamer a similar pressure lock is employed so that the steamer will be maintained under constant pressure and yet permit the ready removal of the wheat from the steamer.

The wheat discharged from the pressure lock at the upper end of the steamer is conveyed to a cooler. The cooler comprises a long cylinder equipped with a series of internal fins or ribbons. The cylinder revolves and the fins cause the wheat to advance. While the fed wheat is moving through the cooler, a continuous blast of cooling air is introduced into the cooler and the tumbling of the wheat by the rotation of the cylinder prevents the wheat from becoming stuck together. The cooling air operates to remove some of the moisture from the wheat in this operation.

From the cooler the wheat is subsequently conveyed to dryers. I have found it preferable to use columnar dryers wherein the wheat is caused to tumble downwardly therethrough. Hot air is injected into the dryers and substantially all of the excess moisture is removed from the wheat. In my preferred method, I find it most satisfactory to use two dryers, however, a single, larger dryer may be used or an additional or third dryer may be used. In the present installation, it has been found preferable to use a time interval in the first dryer of approximately ninety minutes at a temperature of approximately 150° F. The wheat is then passed through a second dryer wherein the temperature is reduced to approximately 90° F. After the processed wheat has passed through the second dryer, it has a moisture content which is substantially normal, that is, approximately 10%.

From the second dryer, the wheat is conveyed to a pearler. This is a conventional piece of equipment commonly used in flour mills, and the like, for the purpose of removing the loose outside hulls and the fibrous outer bran. The cooled wheat passes through the pearler in a continuous operation and from there it is conveyed to a cracking machine. The wheat passes through the cracking machine in two stages. In the first stage the majority of the wheat is cracked and in the second stage the coarser uncracked wheat is removed by screening so that the finer material may be separated. In the screening process the fines or dust like particles are removed and the desired end product is packaged for storage or shipment. The total product produced as the result of my process equals approximately 85% of the original wheat subjected to the process. The remaining 15% is the bran and fines and it may be packaged and sold as animal feed or the like.

The product produced is edible and palatable as rice and may be prepared as a food product in many ways. It may be readily stored and transported in one hundred pound sacks or other containers of desired sizes or kinds. The product of this process is an excellent food substance and a substitute for rice or similar grain products.

It will be appreciated that various types of equipment and alternative methods may be used to increase the moisture content of the wheat prior to its being subjected to the substantial heat or temperature in the steamer. As has been previously stated, it is necessary that the wheat contain a substantial quantity of moisture, at least within the range of 40% to 45%, so that when subjected to heat, the starch, in the presence of the moisture of the wheat, will be properly gelatinized and will not be transformed or converted into dextrin, as would be the case if the moisture were not present. Similarly, the specific treatment may be altered both as to time and temperature without departing from the spirit or teaching of my invention.

The method herein outlined and described is found to be a preferable method for commercial production, however, slight or moderate alterations and changes may be made in the various stages without altering the basic concept of my new and improved process or the characteristics of the product resulting from the treatment to which the wheat is subjected.

In the drawing I have illustrated in a schematic manner, the positioning of the various items of equipment used in carrying on the several steps or stages of the process. As previously stated, this equipment may be altered in design and number of multiple units so long as the desired result is obtained of providing the required moisture content in the wheat prior to the steaming stage. All of the equipment presently employed is conventional, readily available commercial equipment used in flour mills and other grain processing plants.

Referring more in detail to the drawings:

The washer is designated in its entirety by reference numeral 10 and it includes as a part thereof, an upwardly inclined box-like structure 11 wherein the wheat to be washed is deposited. Subsequent to its being washed, the wheat is removed from the washer and discharged from the higher end of the upwardly inclined box by a screw conveyor 12. The conveyor discharges the washed wheat into a chute 13 that feeds into a horizontal screw conveyor 15. This discharges into a settling tank 20. Feeding into the screw conveyor 12 is a water line 16 and a stream line 17. The water is sprayed upon the wheat and sufficient steam is employed to increase the wheat temperature to approximately 150° F. The quantity of water is regulated or limited to the amount which the wheat can absorb during the conveying operation and during the time that the wheat is contained within the settling tank 20.

Wheat received from the conveyor 15 into the top of the tank 20 settles downwardly as wheat is removed from the bottom of the tank; removal being effected by a screw conveyor 21. Water and steam lines 22 and 23, supply a spray of water and the required steam to the conveyor 21 in the same manner as to conveyor 15. From the conveyor 21, the wheat is discharged into the top of a settling tank 24. As it settles, it is removed from the bottom of this tank by a horizontal conveyor 25 and discharged into the top of the settling tank 28. Steam and water are admitted by lines 26 and 27 to the conveyor 25 as to the conveyor 15. When the wheat is removed from this tank, its moisture content has been increased to approximately 35%.

From the tank 28, the wheat is conveyed by means designated by numeral 30, which might be a combination of screw conveyor and bucket conveyor, to a horizontal screw conveyor 31. Steam is injected into this conveyor 31 through a pipe line 32 so as to further increase the temperature of the wheat. From the conveyor 31, the wheat is discharged into a blancher or hydrator 33. Additional steam and water are introduced into the blancher through pipe lines 34 and 35, so as to increase the temperature to approximately 200° F. The wheat, emersed in water, is slowly moved through the blancher by a screw conveyor means 36 and then removed from the water. The time required in the blancher is approximately six to seven minutes.

From the blancher, the wheat passes through a pressure steamer, designated in its entirety by reference numeral 40. The steamer is inclined from its lower, receiving end toward the upper, discharge end and a screw conveyor means 41 is provided therein to move the wheat through the steamer. Pressure locks 42 and 43, preferably of rotary valve type, are provided at the entrance and discharge ends of the steamer so as to permit the receipt and discharge of the wheat and at the same time maintain the required and desired pressure. A steam supply line 44 is provided for the admission of steam into the steamer and the steam pressure is maintained at approximately thirty pounds per square inch. The time required for moving the wheat through the streamer is approximately one hundred seconds or slightly more than one and one-half minutes. During the treatment and processing of the wheat through the steamer, the moisture content of the wheat is approximately 45%.

When the wheat is removed from the steamer through the pressure lock 43, it passes to a cooler 51 and as it is conveyed through the cooler, by means of a rotating cylinder, cool air is drawn into the cooler through an inlet 52 at one end, by means of a suction fan 53 located at the other end of the cooler. The revolving cylinder includes a series of spirally inclined fins or ribbons 54 which cause the wheat to be moved forwardly in the cooler as the cylinder rotates and at the same time the wheat is tumbled to prevent the wheat berries from becoming stuck together.

After the wheat passes through the cooler 51, it is conveyed to a series of dryers by conveying means 55. The dryers are designated respectively by the numerals 60 and 61. The wheat first passes through the dryer 60 and from there is conveyed to the top of the second dryer 61. Hot air is supplied to the dryers through the air vents 62—62 positioned in vertical spacing along the sidewalls of the dryers. The wheat enters each of the dryers at the top, and baffles 64 are provided therein which cause the wheat to be tumbled as it falls. The dryers are of substantial size and it requires approximately one and one-half hours for the wheat to pass through each dryer. The hot air blown into the dryers ranges in temperature from 150° to 190° F. When the wheat has run through the second dryer, its moisture content will have been reduced approximately to normal, that is, to about ten percent. From the second dryer, the wheat is conveyed by conveying means 65 to a pearler or huller 70. This is merely a conventional machine and in the drawing is merely represented by a rectangular box. From the pearler the wheat passes to a grinder or cracker 71 and from the grinder to a sifter 72. In the sifter, the desired product is separated from the fines and is carried away to a packaging station (not shown) by a conveying means 73. The fines are removed through the conveying means 74. The total product received is approximately eighty-five percent of the wheat which is treated in the process. The fines represent approximately fifteen percent.

It is not my intention nor desire that my invention be limited to the specific machines described or the specific relationship of the machines. My invention resides in a method of processing wheat and the specific steps or mechanisms may be altered to conform to requirements of various installations.

Having thus described my invention, what I claim as new therein and desire to secure by Letters Patent is:

A continuous method of processing wheat which comprises cleaning the wheat, subjecting the cleaned wheat to heat and moisture in a multiple-stage treatment, each stage comprising spraying the wheat with water while continuously moving the wheat and simultaneously increasing the temperature of the wheat to approximately 150° F. in the presence of steam and then discharging the water-laden wheat into the top of a settling zone and allowing it to move downwardly therein, said multiple-stage treatment increasing the moisture content of the wheat to approximately 35% at the end of the last of said stages, then subjecting the wheat to steam and hot water and continuously moving the wheat therethrough to increase the temperature of the wheat to approximately 200° F. and increasing the moisture content thereof to at least 40%, steaming the wheat under a pressure of approximately 30 p.s.i. for approximately one and one-half minutes while continuously moving the wheat, cooling the wheat while continuously tumbling the wheat, drying the wheat in the presence of hot air in the range of 150° to approximately 10%, then pearling, cracking and finally screening the wheat to separate the fines and bran from the processed product.

References Cited in the file of this patent

UNITED STATES PATENTS

| | | |
|---|---|---|
| 2,264,574 | Kellogg | Dec. 2, 1941 |
| 2,358,251 | Huzenlaub et al. | Sept. 12, 1944 |
| 2,498,573 | Ozai-Durrani | Feb. 21, 1950 |

FOREIGN PATENTS

| | | |
|---|---|---|
| 669,900 | Great Britain | Apr. 9, 1952 |